United States Patent [19]

Piereder

[11] Patent Number: 4,565,054

[45] Date of Patent: Jan. 21, 1986

[54] MEAT PACKAGING APPARATUS

[76] Inventor: Ludwig Piereder, Squire Ct., R.R. #1, Waterloo, Ontario, Canada, N2J 4G8

[21] Appl. No.: 539,575

[22] Filed: Oct. 6, 1983

[51] Int. Cl.⁴ ............................ A22C 7/00; B65B 3/18
[52] U.S. Cl. ........................................... 53/517; 17/39; 53/530; 53/576
[58] Field of Search ................... 17/38, 39, 32, 49, 33, 17/35, 34; 53/517, 505, 122

[56] References Cited

U.S. PATENT DOCUMENTS

| | | | |
|---|---|---|---|
| 2,397,812 | 4/1946 | Russell et al. | 53/122 |
| 3,703,064 | 11/1972 | Lugiewicz | 53/122 |
| 4,091,504 | 5/1978 | Wong | 17/32 |
| 4,257,145 | 3/1981 | Bovino | 17/32 |

Primary Examiner—Willie G. Abercrombie

[57] ABSTRACT

A meat packaging apparatus comprises a horn having an inlet thereto intermediate the ends thereof. A knife is located adjacent the inlet for severing meat locating partly in the horn, and a ram locates normally in the rearward part of the horn for extruding meat in the horn into a casing therefor mounted on the forward portion of the horn.

11 Claims, 4 Drawing Figures

MEAT PACKAGING APPARATUS

FIELD OF THE INVENTION

This invention relates to food machinery. It particularly relates to machinery for handling meat especially whole muscle meat such as ham. While it is described in respect of this application, the invention is not necessarily restricted thereto.

BACKGROUND OF THE INVENTION

The stuffing of meat into casings is well known in the art. In accordance with general principles a casing is located on a horn, and meat extruded into the casing which is tied off periodically to provide discrete packages. Difficulty arises when it is required to pack a precise quantity of meat into each discrete package. Thus in whole muscle meats such as ham, a relatively large portion of meat may locate where it is desired to tie off the package. The problem may be overcome by severing the meat at a pre-determined juncture prior to the meat being encased. In accordance with one proposal, a radial knife is provided immediately adjacent the end of the horn. Actuating mechanism for the knife cannot locate on the exterior of the horn due to the location of the casing thereon. Such knife actuating mechanism must therefore pass along the interior of the horn, thereby serving to restrict its diameter. Perhaps more importantly, the knife itself serves as a serious restriction, the effective diameter of the horn in the vicinity of the knife being approximately one half the actual internal diameter.

In accordance with other proposals, the horn itself may serve to measure the desired portion of meat to be packed; however, this necessitates changing horns for each different amount to be packed. It also becomes impractical when the amount to be packed is relatively small, as this severely limits the amount of casing that can be stored on the horn.

It is a prime object of the invention to provide apparatus of the aforementioned type which can be employed to pack widely differing quantities of product with reasonable accuracy without necessitating changing component parts.

It is a further main object of the invention to provide such apparatus which is substantially devoid of flow restriction.

SUMMARY OF THE INVENTION

In accordance with the foregoing, these and other objects as will become apparent from the ensuing description of the invention are broadly fulfilled in one aspect of the invention by apparatus comprising a horn and a conduit connecting intermediate portions of the horn to a meat pump. In rearward portions of the horn there is located a ram. A cutting knife is provided for severing meat at the juncture of the conduit and the horn. Motor means, typically fluid operated linear motors, are provided for actuating the knife and for forcing the ram along the horn to extrude the contents thereof into a casing.

Desirably, actuation of the cutting knife also serves to close off the horn from the conduit, whereby actuation of the ram will not serve to force meat from the horn back into the conduit, which would thereby reduce the volume of meat contained within the horn.

In accordance with another aspect of the invention the conduit connects to the horn in the radial wall thereof, and the cutting means is in the form of a hollow piston slidable within the horn, the free edge of the piston being bevelled to a cutting edge. Expediently the hollow piston forms a cylinder for the ram when the ram locates in rearward portions of the horn, the hollow piston having an internal diameter equal to that of forward portions of the horn so as to provide a continuous sliding surface for the ram when the hollow piston is moved into abutment with the forward portions of the horn.

Expediently the motors for the ram and the knife comprise cylinders unitarily formed with the rearward portions of the horn.

In accordance with another embodiment of the invention, the forward and rearward portions of the horn are mounted on plates which are relatively movable, the conduit also being mounted on the plate carrying the rearward horn portion. Relative movement of the plates alternately aligns the forward horn portion with the conduit, when the forward horn portion is charged with meat, and the rearward horn portion, a ram contained with the rearward horn portion serving to extrude the meat completely from the horn. One or more knives is provided between the facing surfaces of the plates to sever the meat at the juncture of the conduit and the horn contemporaneously with the movement of the plates. The plates to which the forward horn portion connects further acts to seal whichever of the conduit and the rearward horn portion that is not aligned with the forward horn portion.

Preferably the plate carrying the forward horn portion is fixed, and the other plate is movable relative thereto.

BRIEF DESCRIPTION OF THE DRAWINGS

These aspects and other aspects, objects and advantages of my invention will be further described in relation to the accompanying drawings wherein.

DESCRIPTION OF ILLUSTRATED EMBODIMENTS

Figure 1:
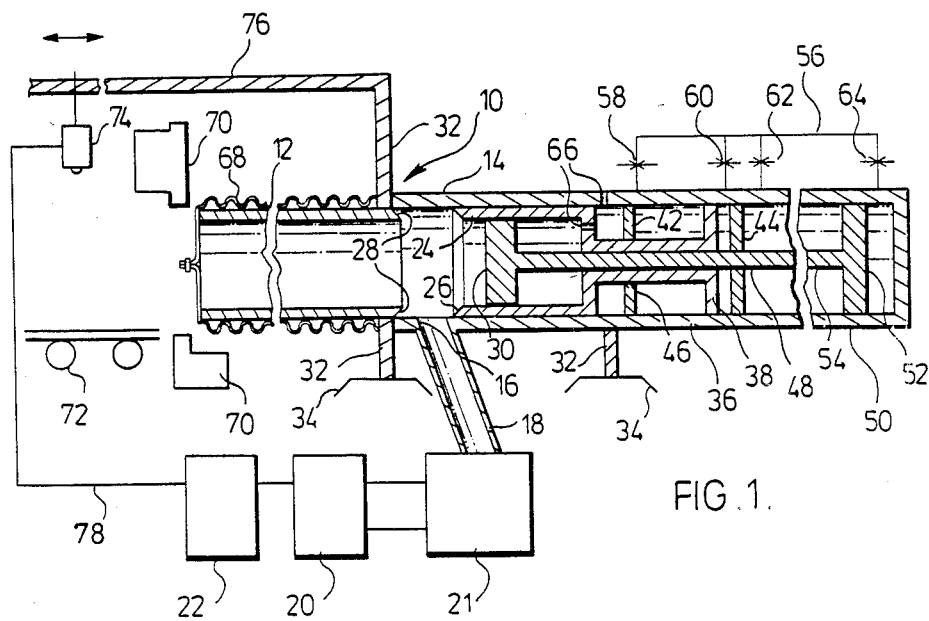
FIG. 1—is an axial cross section of apparatus of the invention shown at the beginning of an operational cycle.
Figure 2:
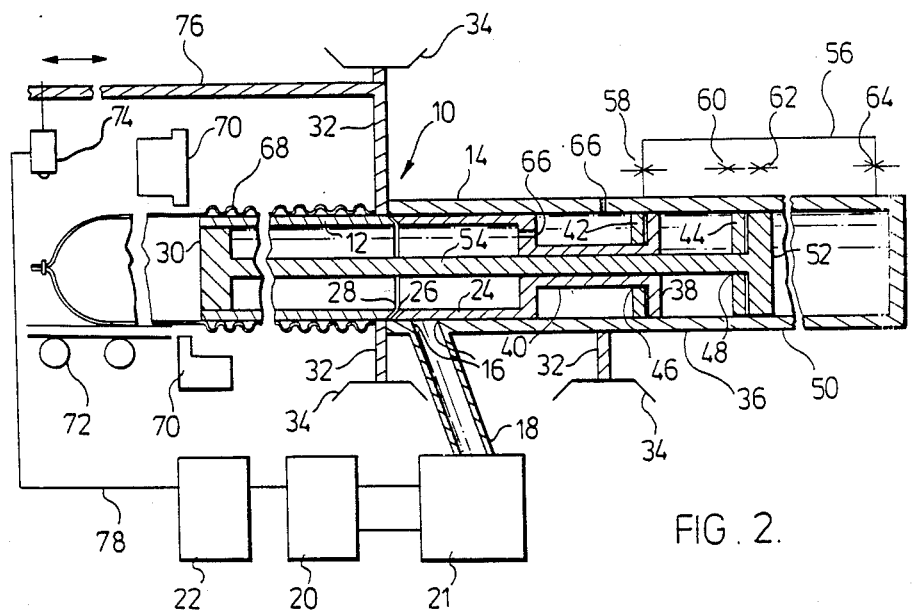
FIG. 2—is similar to FIG. 1, but shows the apparatus at the end of the discharge portion of the cycle.

Referring now to the drawings in detail, a meat packaging apparatus in accordance with a first embodiment of the invention is shown in FIGS. 1 and 2, and comprises a horn 10 having a forward portion 12 and a rearward portion 14, the rearward portion having a diameter marginally greater than that of the forward portion for a purpose to be later described. Horn 10 is provided with an opening 16 in the radial wall of the rearward portion, which opening connects to a conduit 18, the other end of the conduit connecting to a meat pump 20 which may be, for example, as further described in my U.S. Pat. No. 4,060,349; optionally a portioner 21, for example of the type described in my U.S. Pat. No. 4,188,767 may be inserted in conduit 18, depending on the desired mode of operation of the apparatus as will be further described. A drive motor 22 is operatively connected to meat pump 20.

A knife 24 in the form of a tubular member having an outer diameter equal to the inner diameter of rearward horn portion 14 and an inner diameter equal to the inner diameter of forward horn portion 12 is slidably mounted in rearward horn portion 14. The forward peripheral edge 26 of tubular knife 24 is bevelled at an angle of 45°, to provide a chisel like cutting edge.

The rearward peripheral edge 28 of foward horn portion 12 is provided with a bevelled edge complementary to the bevelled edge of the tubular knife 24, so that when the knife moves to its forward position, as seen in FIG. 2, the inner surfaces of the knife and forward horn portion form a continuum. In FIG. 2 a small space is shown between the peripheral edges 26 and 28 for the purpose of clarity.

A ram 30 having a diameter equal to the inner diameter of tubular knife 24 (and therefore equal to the inner diameter of forward horn portion 12) is slidably mounted in and surrounded by tubular knife 24. Horn 10 is secured to the bed 34 of the packaging apparatus by supports 32.

Tubular knife 24 is operatively connected to a pneumatic motor comprising cylinder 36 which is aligned with horn 10, conveniently in coaxial relationship therewith, and piston 38 mounted within cylinder 36. A hollow connecting rod 40 interconnects piston 38 to tubular knife 24 at the rearward end thereof. The axial ends of cylinder 36 are sealed with radial walls 42,44. Wall 42 has a central opening 46 therein equal to the external diameter of connecting rod 40, and wall 44 a central aperture 48 equal to the diameter of the axial opening in connecting rod 40.

Ram 30 is operatively connected to a second pneumatic motor comprising cylinder 50, which, as illustrated here, is conveniently formed unitarily with cylinder 36 and rearward horn portion 14, having a piston 52 mounted for reciprocal movement therein, and connected to the ram by a connecting rod 54. The operative stroke of the second pneumatic motor will normally be such as to permit travel of ram 30 between the extreme positions illustrated in FIGS. 1 and 2. A pneumatic line 56 connects to cylinders 36 and 50 adjacent each axial end of the cylinders through valves 58,60,62 and 64, each of which in one position permits the cylinder to be exhausted to atmosphere. An air path 66 is provided adjacent the juncture of horn 10 and cylinder 36 and through the web of knife 24 to permit the passage of air and from horn 10 as ram 30 is moved in the horn.

Having described the apparatus thus far, the manner of operation will be described. Assuming pistons 38 and 52 to be in their rearward positions, as shown in FIG. 1, knife 24 and ram 30 will be rearwardly positioned in relationship to the opening 16 locating at the juncture of the horn 10 and conduit 18. Assuming portioner 21 not to be present, meat will be pumped by pump 20 directly into horn 10, and it will be extruded from the forward orifice thereof. A shirred casing 68 is mounted on horn 10. A stapler 70, for example as described in my U.S. Pat. No. 4,188,767 is normally mounted adjacent the foward orific of horn 10 to staple casing 68 closed. Other closure means as known in the art may be equally employed. Extruded meat will fill casing 68, and the filled casing will move forwardly along a conveyer 72. An end detector 74 is adjustably mounted from a support 76 from the bed 34 of the apparatus. End detector 74 may be of any convenient form, for example a photoelectric detector. Upon sensing the end of the casing, a disabling signal is sent by line 78 to stop drive motor 22.

Piston 38 is then moved forwardly by actuation of valve 60, thereby causing knife 24 to sever meat at the opening 16 of horn 10, to close the conduit 18, and to form a continuum of the forward horn portion. Preferably, this forward movement of the knife 24 will not entrain ram 30, at least until such time as opening 16 is substantially closed, so as to reduce the possibility of expulsion of meat from the horn through conduit 18. When the knife 24 is in its forward position, the volume of meat contained within the horn 10 is known, and the position of end detector 74 will have been adjusted so that the volume of meat in casing 68, together with the volume of meat in the horn, is equal to the desired volume. The meat contained within horn 10 is extruded into casing 68 by suitable actuation of valves 62 and 64, so as to cause piston 52 to move forwardly and ram 30 therewith, until the ram reaches the forward extent of its travel as shown in FIG. 2. Stapler 70 is then actuated to close off the end of the stuffed casing 68, at which time piston 52 and the ram 30 therewith is retracted, following which piston 38 and knife 24 therewith is retracted to complete the cycle of operation. Control signals for the automatic operation of the cycle may be generated by means well known in the art.

When portioner 21 is included in the apparatus the mode of operation differs slightly from that described above. The inclusion of the portioner 21 is especially useful where the volume of meat to be included in the individual packages is less than the volume of horn 10. Here the measured portion of meat is discharged by portioner 21 into horn 10, at which time a signal from the portioner would initiate the actuation of knife 24 and the ensuing cycle in the manner above recited.

Figure 3:
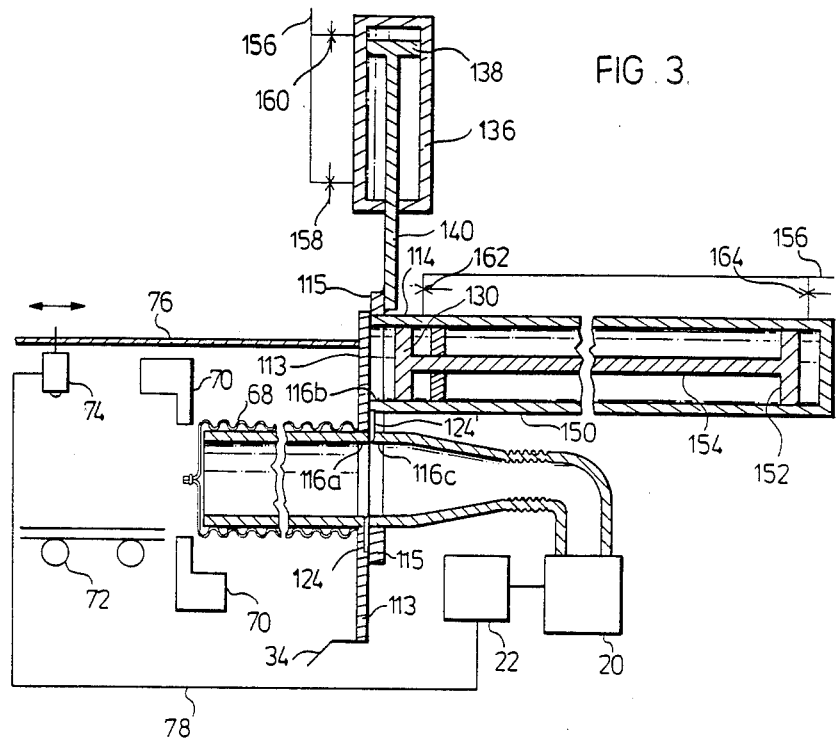
FIG. 3—is an axial cross section of a second embodiment of the invention, shown at the beginning of the cycle, and FIG. 4—is similar to FIG. 3, but shows the apparatus at the beginning of the discharge portion of the cycle.
Figure 4:
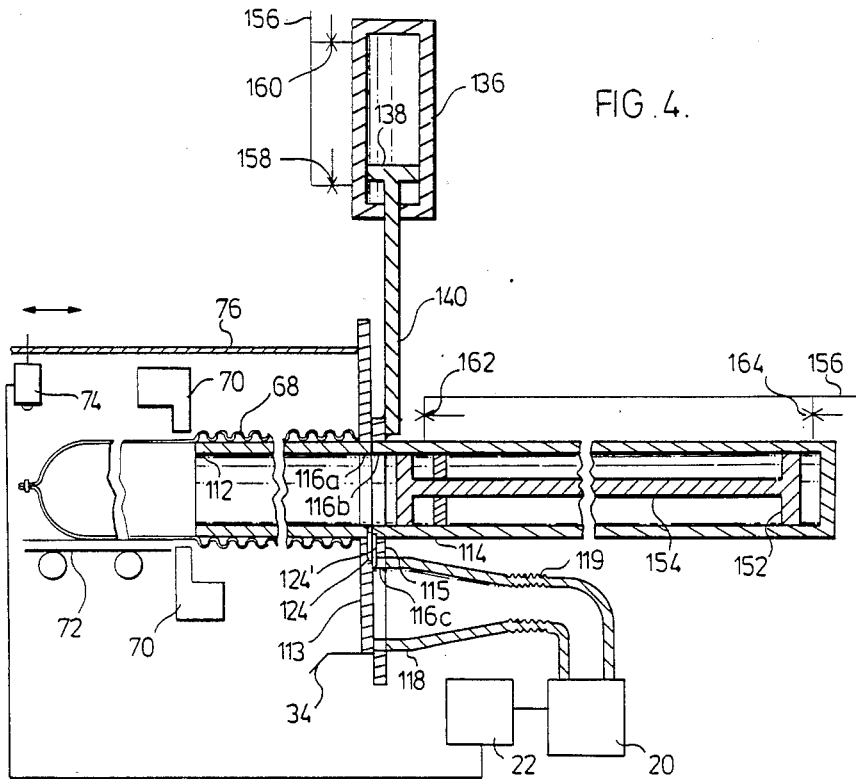

In accordance with a second embodiment of the invention as shown in FIGS. 3 and 4, the forward portion 112 of a horn is mounted from the bed 34 of the apparatus by a plate like support 113 having an aperture 116a therein, the rearward horn portion 114 secures to a second plate like support 115 having an aperture 116b therein, plate 115 being mounted from plate 113 to be slidable with respect thereto. Horn portions 112 and 114 are of equal diameter, and apertures 116a and 116b have walls which form a continuum with the inner surface of the horn portions. Spaced apart from the rearward horn portion, and also mounted on plate 115 is a conduit 118 at least a portion 119 of which is flexible, the conduit connecting to meat pump 20 having a drive motor 22. It will be understood that portioner 21 may also be included in conduit 118 in a similar manner and for a similar reason to that described in connection with the first embodiment. Conduit 118 connects to an aperture 116c in plate 115. A knife blade 124 is let into plate 113 so as to be sandwiched between the facing surfaces of plates 113 and 115. The cutting edge of knife 124 will have a semi-circular plan form having a radius approximately equal to that of the inner surface of horn portion 112. A similar knife blade 124' is let into the sliding surface of plate 115 to partly surround opening 116c, knife blades 124, 124' being diametrically opposed with the diameter being transverse to the sliding path of plate 115.

A pneumatic motor comprising a cylinder 136, a piston 138 and a connecting rod 140 connects to plate 115. At the one limit of travel of piston 138, as shown in FIG. 3, conduit 118 and forward horn portion 112 are coincident. At the opposed limit of travel of piston 138, as shown in FIG. 4, the forward portion 112 and the rearward portion 114 of the horn are coincident. It will be remarked that plate 113 serves to close off apertures 116b and 116c when these apertures locate in non-aliged position with aperture 116a.

Within rearward horn portion 114 there locates a ram 130. Ram 130 is driven by a pneumatic motor comprising a cylinder 150 having a piston 152 and connecting rod 154, the pneumatic motor being supported from plate 115 so as to be movable therewith. Expediently and preferably, cylinder 150 and rearward horn portion 114 are unitarily formed. Valves 158, 160, 162 and 164 are provided to connect cylinders 136 and 150 to pneumatic line 156 for the actuation of pistons 138 and 152.

The mode of operation of this second embodiment of the invention is closely similar to that described for the first embodiment, and casing 68, stapler 70, conveyor 72 and detector 74 and its support 76 are as described in connection with that embodiment. At the start of a cycle pistons 138 and 152 are withdrawn, as shown in FIG. 3, whereby conduit 118 is in flow communication with the horn. Meat is extruded from the forward horn portion 112 into a casing 68 until the filled end of the casing is sensed by detector 74, a signal therefrom on line 78 serving to disable drive motor 22. Actuation of valve 160 slides plate 115 across plate 113, knives 124, 124' thereby severing meat bridging across openings 116a, 116b, and simultaneously moves the rearward horn portion 114 into coincidence with the forward horn portion as seen in FIG. 4. Actuation of valves 162 and 164 urges ram 130 forwardly to extrude meat completely from the horn. Retraction of pistons 152 and 138 completes the cycle. The cycle of operation when a portioner 21 locates in conduit 118 is essentially analogous to that earlier described in connection with the first embodiment.

It will be apparent that many departures from the illustrated embodiments may be made. The illustrated embodiments are intended to be exemplary only of preferred apparatus for putting the invention into effect, and are not intended to be limitative of at least the broad aspects of the invention claimed.

I claim:

1. Meat packaging apparatus comprising:
   a horn having a forward portion and a rearward portion;
   a ram normally contained within said rearward horn portion for reciprocal movement along said horn;
   motor means operatively connected to said ram;
   a conduit connecting to intermediate portions of said horn for carrying a supply of meat thereto;
   cutting means comprising a tubular knife mounted within rearward horn portion for severing meat located at the juncture of said conduit and said horn, said tubular knife serving as a cylinder for said ram when said ram is in a retracted position, and
   motor means operatively connected to said cutting means.

2. Apparatus as defined in claim 1, wherein actuation of said cutting means to sever said meat serves to close off the conduit from the horn.

3. Apparatus as defined in claim 1, wherein said motor means for said ram comprises a linear fluid operated motor including a cylinder, said cylinder being unitarily formed with said rearward horn portion.

4. Apparatus as defined in claim 1, further comprising a portioning cell connected to said conduit.

5. Apparatus as defined in claim 1, further comprising a meat pump including drive means therefor connected to said conduit, and sensing means for detecting the position of meat product extruded from said horn and connected so as to disable said drive means.

6. Apparatus as defined in claim 1, wherein said conduit means connects to said horn in a radial wall thereof, and wherein said cutting means is mounted for axial movement within said horn.

7. Apparatus as defined in claim 6, wherein said motor means for said cutting means is a piston operated fluid motor connected to said cutting means by a connecting rod.

8. Apparatus as defined in claim 7, which said motor means for said ram comprises a piston operated fluid motor connected to said ram by a connecting rod.

9. Apparatus as defined in claim 8, wherein one said connecting rod is mounted to slide telescopically with the other.

10. Apparatus as defined in claim 9, wherein the rearwardly facing periphery of said forward horn portion and the forwardly facing edge of said knife has a complementary bevelled surface.

11. Apparatus as defined in claim 9, wherein said knife has an internal diameter equal to the internal diameter of said forward horn portion.

* * * * *